United States Patent [19]

Hawkins et al.

[11] Patent Number: 4,841,359
[45] Date of Patent: Jun. 20, 1989

[54] PHOTOGRAPHIC APPARATUS FOR MAKING SIMULTANEOUS EXPOSURES

[75] Inventors: Ross H. Hawkins, Woodridge; David Laing, Acacia Ridge; Bryan C. Bedington, Kangaroo Point, all of Australia

[73] Assignee: Bryna Pty. Ltd., Queensland, Australia

[21] Appl. No.: 157,480

[22] PCT Filed: Mar. 18, 1987

[86] PCT No.: PCT/AU87/00076
§ 371 Date: Nov. 12, 1987
§ 102(e) Date: Nov. 12, 1987

[87] PCT Pub. No.: WO87/05716
PCT Pub. Date: Sep. 24, 1987

[51] Int. Cl.⁴ ............................................. H04N 1/46
[52] U.S. Cl. ..................................... 358/76; 358/224; 354/76
[58] Field of Search ................ 358/224, 76, 209; 354/75, 76, 105, 106, 109

[56] References Cited

U.S. PATENT DOCUMENTS

| | | | |
|---|---|---|---|
| 2,478,301 | 8/1949 | Mourfield | 354/108 |
| 2,565,618 | 8/1951 | Mourfield | 354/118 |
| 3,608,456 | 9/1971 | Hauser | 354/88 |
| 3,928,863 | 12/1975 | Stewart et al. | 354/109 |
| 4,248,510 | 2/1981 | Baker et al. | 354/109 |
| 4,488,794 | 12/1984 | Dolgow et al. | 354/83 |
| 4,714,962 | 12/1987 | Levine | 358/76 |

FOREIGN PATENT DOCUMENTS

57-52037 3/1982 Japan.
57-109927 7/1982 Japan.

Primary Examiner—Jin F. Ng
Assistant Examiner—Stephen Brinich
Attorney, Agent, or Firm—Renner, Otto, Boisselle & Sklar

[57] ABSTRACT

A photographic system where a still camera (21) and a video camera (20) are employed to view and photograph an object. The video camera (20) is employed to capture images of an object and each image is combined with a unique code. The still camera (21) produces latent images correspondingly coded and the video images may be printed or displayed on an image printer (23) to enable a selection of desired prints to be made without the need to process the film of the still camera (21) to provide proofs.

18 Claims, 9 Drawing Sheets

PHOTOGRAPHIC APPARATUS FOR MAKING SIMULTANEOUS EXPOSURES

TECHNICAL FIELD OF THE INVENTION

The invention relates to a photographic system and to a method of producing and displaying images representative of proofs of a photograph.

BACKGROUND OF THE INVENTION

When a photographer conducts a photographic session or sitting either outdoors, in a studio or at some other location a series of pictures are taken of a subject. A number of rolls of film may be exposed in the session. Alternatively, if sheet rather than roll film is employed a plurality of sheets of film may be exposed. The rolls or sheets are usually recorded in a log book in which the photographer enters details such as the date on which the photographs were taken, identification of the customer and/or subject and other information. The roll or stack of sheet film is correspondingly marked. There is a real danger that incorrect entries may be made or that entries or the book may go astray. This causes difficulty in returning prints from the film to the right customer or to the correct photographer where one processing laboratory is responsible for processing film for many photographers.

Once film is exposed it is usual to produce proofs of all of the exposures and to return to the customer with the proofs to enable a selection of desired ones of the photographs to be made from the set of proofs. Thus, a photographer attends the session or sitting and a representative may then return to the customer with proofs to enable a selection to be made. After the selection process the desired photographs are printed and returned to the customer. In many cases therefore two or sometimes three separate visits are necessary, i.e. one by the photographer, another by the representative and perhaps another to deliver the prints. Not only is this time consuming and expensive but sales are sometimes lost because of the delay between the sitting at which the customer may be enthusiastic about a purchase to the time when the proofs are presented at which time his enthusiasm may have waned. Also considerable travelling between the location at which the sitting took place the the laboratory may be necessary and this is costly and this cost is passed onto the customer.

The need to prepare proofs is itself time consuming and expensive. Whilst all of the exposed film needs to be proofed only a small number of shots may be acceptable to the customer and all proofs may sometimes be destroyed after they have been viewed. The printing of proofs adds to the expense because time and materials are involved in their production.

SUMMARY OF THE INVENTION

It is an object of the present invention to provide a photographic system and a method of producing and displaying images which at least minimise some of the disadvantages referred to above.

According to one aspect of the invention there is provided a system including a first camera for producing latent images of an object on file which may subsequently be processed, a second camera integral with or adjacent the first camera adapted to produce images substantially corresponding to the latent images of the first camera whereby respective images of the second camera correspond to respective latent images of the first camera; coding means for uniquely coding each said latent image and for correspondingly coding the images produced by the second camera; and, image display means for displaying or providing viewable image of the images produced by the second camera.

The first and second camera may comprise a single unit or alternatively may be separate from one another or may be adapted to be mounted or coupled together to function as a single unit.

The first camera produces latent images on photographic film. The first camera may be a still camera and whilst either roll or sheet film may be used it is preferred that it be a roll film still camera. Ideally, the still camera is a twin lens reflex (TLR) camera although a single lens reflex (SLR) camera or any other type may also be used.

The second camera, as mentioned above may either be formed as a single unit with the first camera or be coupled thereto or be located closely adjacent thereto. Thus, the second camera "sees" substantially the same object viewed by the first camera.

The second camera produces images which may be substantially instantly viewed. Thus the second camera means may be instant camera which produces self developing pictures such as a Polaroid (Registered Trade Mark) camera. Alternatively, the second camera is a motion picture camera which either produces images recorded on magnatic tape or instant motion picture film like that made by the Kodak company. In a preferred form, the second camera is a video camera which provides for continuous viewing of the object and selected still images of the objection may be captured.

The display means and replay means may be integral with the second camera means or may be separate therefrom. Where the second camera means is a video camera both the replay means and display means may be integral therewith. The display means may comprise the view finder of the camera and the replay means may comprise internal circuitry of the camera which causes images to be displayed on the view finder.

It is preferred that the display means comprise a separate television monitor whereby a relatively large image may be displayed. The monitor may be either a black and white or a colour monitor. The replay means may comprise a separate video recorder/playback unit coupled to both the monitor and the camera.

The display means in one embodiment may comprise a thermal or other type of printer which, when adapted to receive signals from the second camera, may produce substantially instantaneous images of the object bearing a unique code.

If desired storage means may be asociated with the system whereby images produced by the second camera may be stored for subsequent retrieval and printing by the thermal printer or other printer or be displayed on a monitor. The storage means may store the images on any suitable medium such as magnetic tape or disc or in a digital or other memory. In one embodiment an optically readable or laser disc may be used. Alternatively a video tape recorder may be employed.

The system includes coding means for presenting a code which may be recorded along with each latent image and with each corresponding image produced by the second camera. The coding means ensures that the corresponding image produced by the second camera bears a code which corresponds to a code on an associated latent image. The code may be representative of information identifying the photographer, system unit number, that date, the frame number and any other desired information.

The coding means may include a display for producing a code which may be recorded together with the latent images and with the images produced by the second camera. The code display associated with the latent images may comprise a light emitting display. The light emitting display is preferably strobed or otherwise switched so that it is only actuated momentarily during the production of a latent image, prior to this or before the film is advanced in the first camera. In this way the film is not fogged by the code display. The code display may comprise a light emitting diode display. A seven segment seven digit display has been found useful. The two most significant digits may be indicative of the photographer and the remaining digits of the latent image frame member.

The coding for the second camera may be produced internally of that camera or by having that camera view a code display. Where the second camera means is a video camera, the coding may be produced electronically by mixing the composite video signal with code information or magnetically on the video tape as it progresses through the camera. Preferably, the coding is produced by mixing the code information with the composite video signal produced by the second camera.

The system may include flash control for providing additional lighting if that is required. The first camera means may include a synchronising output. The system may include display control and update circuitry.

BRIEF DESCRIPTION OF THE DRAWINGS

A preferred embodiment of the invention will be described by way of example with reference to the drawings in which.

DETAILED DESCRIPTION

Figure 1:
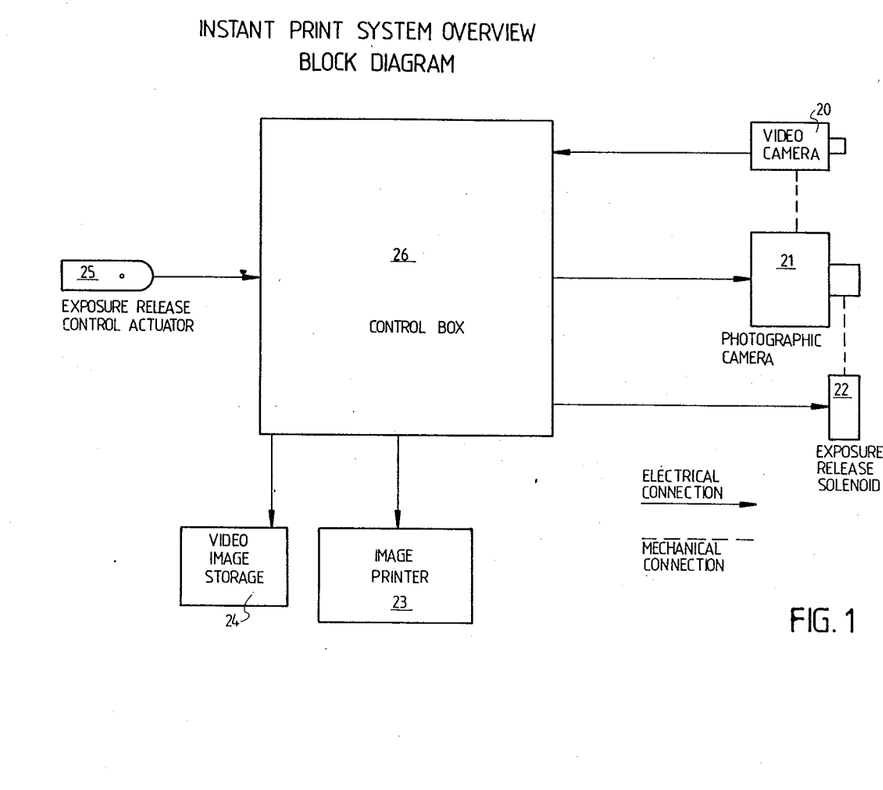
FIG. 1 is a block diagram of a photographic system according to an embodiment of the invention.

As shown in FIG. 1 the system includes a video camera 20 coupled closely adjacent still camera 21 such that both may see the same image. The camera 21 has a solenoid shutter release 22 for operating the shutter of camera 21. The image seen by the video camera 20 is a continuous or moving image and a desired portion of this image is captured as a still image and displayed by printer 23 which produces a hard copy of that still image. If desired, rather than a printer, that still image may be displayed on a television monitor. A preferred printer is a thermal printer although other types may be employed. A particularly preferred printer is a Mitsubishi model P50A. As shown addition video image storage means 24 such as a magnetic tape, disc or other type of storage using computer digitisers may also be used. An exposure release control actuator 25 such as a switch may be used to operate the system. Control box 26 contains circuitry necessary for the operation of the system of the invention.

The operation of the system is such that the camera 20 produces a continuous video image of a subject and to this image a unique code is added. This code may be a multi-digit code indicative of a particular photographer or unit and a number indicative of the number of still photographs or frames taken by camera 21. Camera 21 may for example be a twin lense reflex (TLR) camera or any other suitable still camera and has means for impressing a code on each frame of film shot which corresponds to the code produced for the camera 20. In addition, the camera 21 may have a further code visible to the user which corresponds to the others displayed by the system. This is explained further with reference to FIG. 8. Upon operation of control 25 an instant of the video signal is captured and mixed with information representative of the unique code and supplied to the printer 23. At an instant in time slightly after the image is captured solenoid 22 operates camera 21 to produce a latent image which substantially corresponds to that produced by the printer 23 and which includes the unique code information. The code may be a seven digit code, two digits of which may be assigned as a code identifying a particular photographer and the remaining digits identify the frame number whereby both the printed image and the corresponding photograph from the latent image have the same code. The codes may then be updated whereby the next action produces a print at the printer having a code indicative of the next print number and a further latent image is produced in the camera 21 also having the next print indicative code.

In this way a customer may be shown a series of prints produced by printer 23 from which a selection of photographs may be made and the film of camera 21 is processed and only those photographs with the codes corresponding to the codes on the selected prints need be printed and given to the customer. The customer therefore has the advantage of being able to immediately view prints and make his selection without the need for the production of proofs from the film in camera 21.

Figure 2:
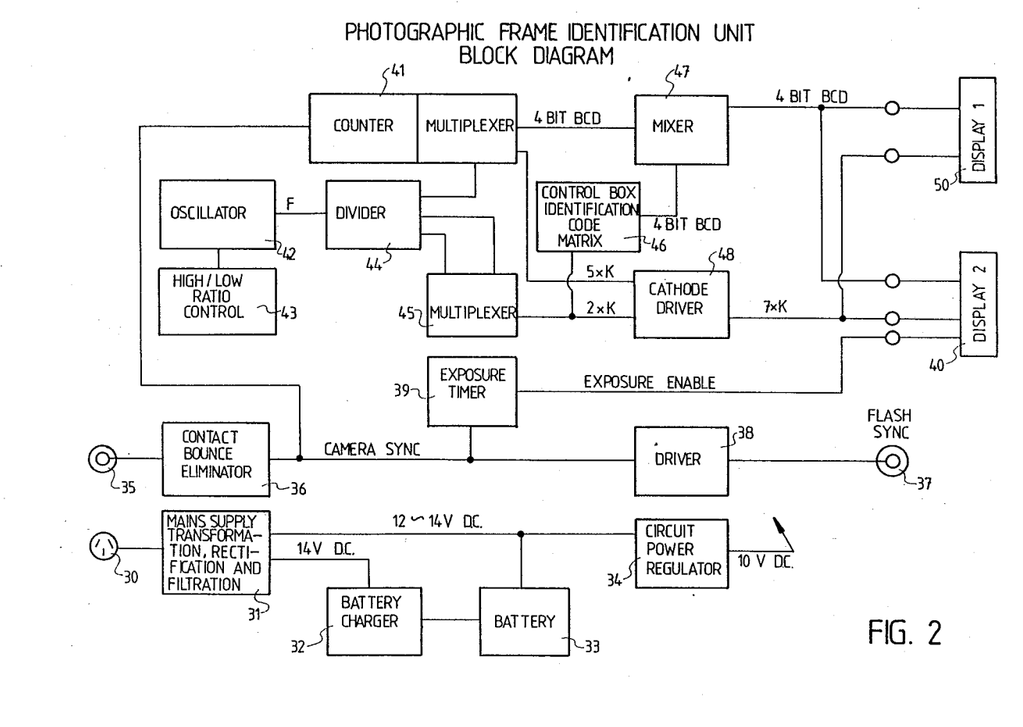
FIG. 2 is a more detailed block diagram of part of the system of FIG. 1.

The block diagram in FIG. 2 is a more detailed diagram of part of the system shown in FIG. 1. Power is supplied at 30 to a transformer, rectifier and filter stage 31. Stage 31 provides two outputs, one of which is employed to operate charger 32 which in turn keeps back-up battery 33 charged. An inverter may also be included to provide alternating power for those parts of the system which require this. Battery 33 can be used to provide back-up power in the case of power failure. The other output from stage 31 form the input to a power regulator 34.

Exposure release signal supplied at 35 from control 25 is supplied to contact bounce eliminator 36 to eliminate multiple triggering. The output from eliminator 36 is made available to a flash syncronising output socket 37 via driver 38 and also to an exposure timer 39. Timer 39 controls the time for which display 40 is on. Display 40 is within the camera 21 and adjacent the film to provide a latent image portion on the film indicative of the code displayed by display 40.

The output from eliminator 36 is also made available to a counter/multiplexer 41 which updates the exposure frame count and multiplexes with this count the code indicative of a photographer or unit. The system has an oscillator or astable 42 coupled to a controller 43 which is capable of adjusting the mark/space ratio of the oscillator. The oscillator 42 is coupled to a divider 44 which produces three outputs. One output is directly coupled to the counter/multiplexer 41 and has a frequency F and the other outputs are provided to a multiplexer 45 and are at a frequency F/2. Multiplexer 45 provides the driver signals for the two most significant bits (MSB) of the display whilst the multiplexer of block 41 provides the driver signals for the remaining bits of the display. Block 41 and code matrix 46 provide the address codes for all digits of the displays and these are combined in mixer 47 which may comprise summing junctions. Cathode drivers 48 receive the drive signals from blocks 41 and 45 and drive the cathodes of both displays 40, 50. The 4 Bit BCD signal from mixer 47 is made available to the encoders associated with displays 40, 50 for converting 4 Bit BCD to signals suitable for the seven segments which make up each digit of each display 40, 50. Display 40 is adjacent the film in camera 21 and display 50 is visible to the photographer through the ground glass screen of the TLR camera. Display 40 is only on for a period determined by timer 39. Counter 41 is updated each time a picture is taken by camera 21 whilst the 4 Bit BCD supplied from matrix 46 is set to be indicative and unique to a particular photographer. Display 50 remains on whilst the system is in use and enables the photographer to see the frame count and his unique code.

Figure 5:
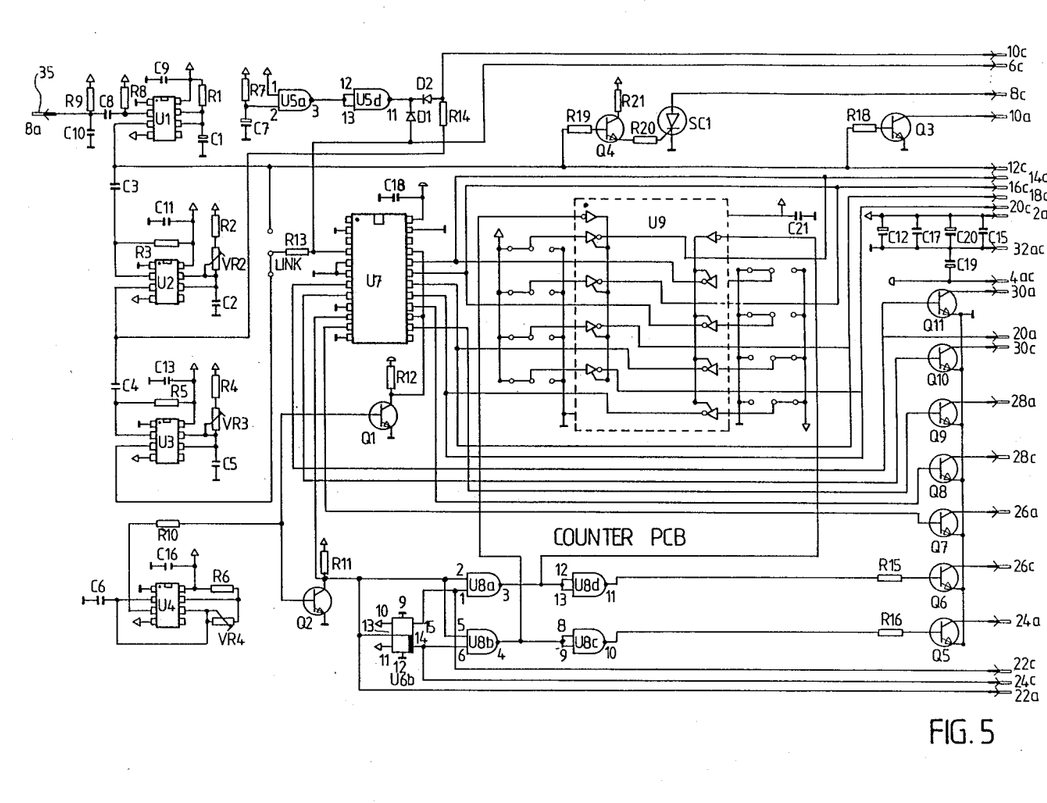
FIG. 5 is a detailed circuit diagram of part of FIG. 2.

A detailed circuit diagram for part of the block diagram of FIG. 2 is shown in FIG. 5. The exposure release signal 35 is supplied at pin 8a to monostable U1 having timing components R1, C1 providing a delay of about 100 ms. Monostable U1 functions as a contact bounce eliminator 36 of FIG. 2. The output from U1 is used to drive the printer and a printer drive signal is available at pin 10a. Monostable U2 receives the output from U1 and its timing components provide a delay of between 20–30 ms. Monostable U2 in turn provides an input to monostable U3 and the exposure enable signal at pin 10c. The output from U3 provides an input to counter/multiplexer U7 (which is the unit 41 of FIG. 2). The monostables provide various stages of delay and enable the release signal 35 to ripple through to counter/multiplexer U7. Device U2 provides an exposure enable signal at pin 10c (U2 is the timer 39 of FIG. 2). The output from U1 provides a flash sync signal at pin 8c via switching transistor Q4 and controlled rectifier SC1 as well as a printer drive signal at pin 10a. The flash sync output need not be used where the camera 21 has a shutter release like that of the embodiments of the drawings. The printer captures several video frames to provide an image. The signal at pin 10a is obtained via driver Q3.

Astable oscillator U4 forms the oscillator 42 of FIG. 2 whilst variable resistor VR4 enables adjustment of the mark/space ratio (shown as block 43 in FIG. 2). The output from oscillator U4 is made available to the counter/multiplexer U7 via transistor Q1 which inverts the output and reduces the impedance. Similarly transistor Q2 inverts the signal from oscillator U4 and reduces the impedance.

Divider U6b is the divider 44 of FIG. 2 and is a flip flop which provides two out of phase signals half the frequency of oscillator 44. Whilst FIG. 2 shows the divider as providing a signal at the oscillator frequency, in reality in FIG. 5 this full frequency signal is obtained from the oscillator via Q1. The outputs from divider U6b are provided to a multiplexer comprising two NAND gates U8a and U8b. This multiplexer of FIG. 5 corresponds to block 45 of FIG. 2. Two inverters U8d and U8c enable the signals from the NAND gates to drive respective drivers Q5, Q6. These drivers drive the cathodes of the two MSB's of the displays 40, 50.

Device U9 (C of block 46 in FIG. 2) is a unit or photographer identification code matrix and determines the code displayed by the two MSB's. For example by having links where indicated the BCD code produced is representative of the number 3 and would indicate that photographer #3 or unit #3 was responsible for any images produced by that unit.

NAND gate U5a together with inverter U5d are responsive at power up of the system to hold the counter input low to prevent spurious signals from falsely advancing the tally of the counter.

The counter/multiplexer U7 together with matrix U9 are responsible for producing both the 4 Bit BCD code for the display BCD/7 segment encoders as well as the drive signals for display drivers Q5–Q11. The 4 Bit BCD is made available at pins 14c, 16c, 18c, 20c.

Capacitors C12, C17, C20 and C15 provide filtering for power supplied to the circuit of FIG. 5 via pins 2ac, 4ac and 32ac.

Figure 3:
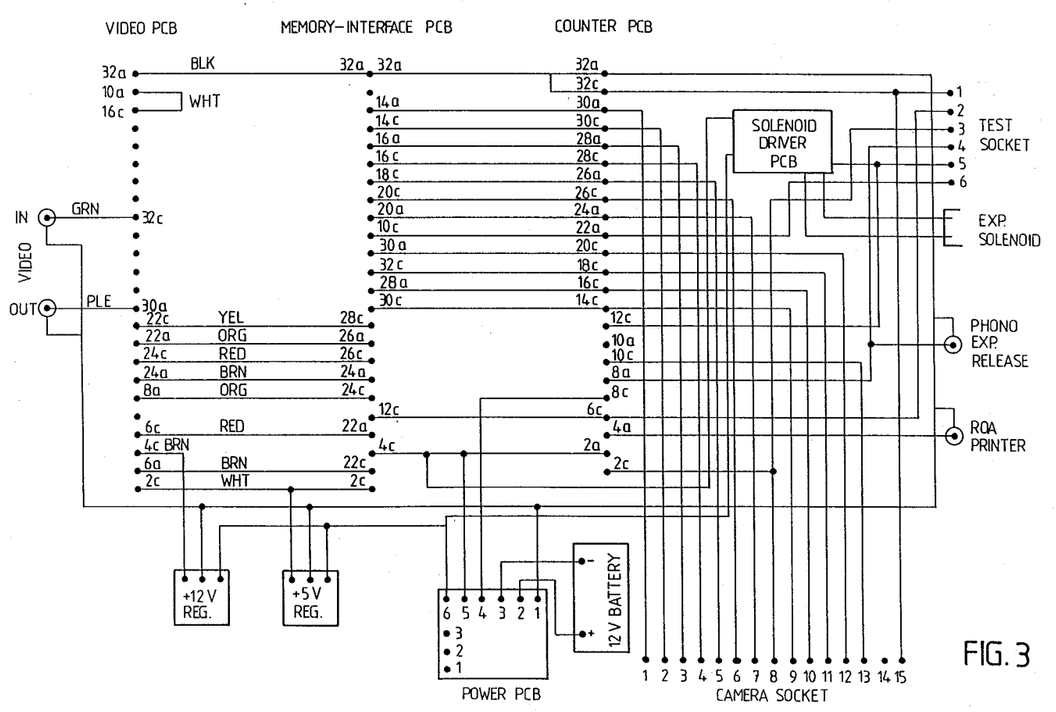
FIG. 3 is a wiring diagram of FIG. 2.
Figure 6:
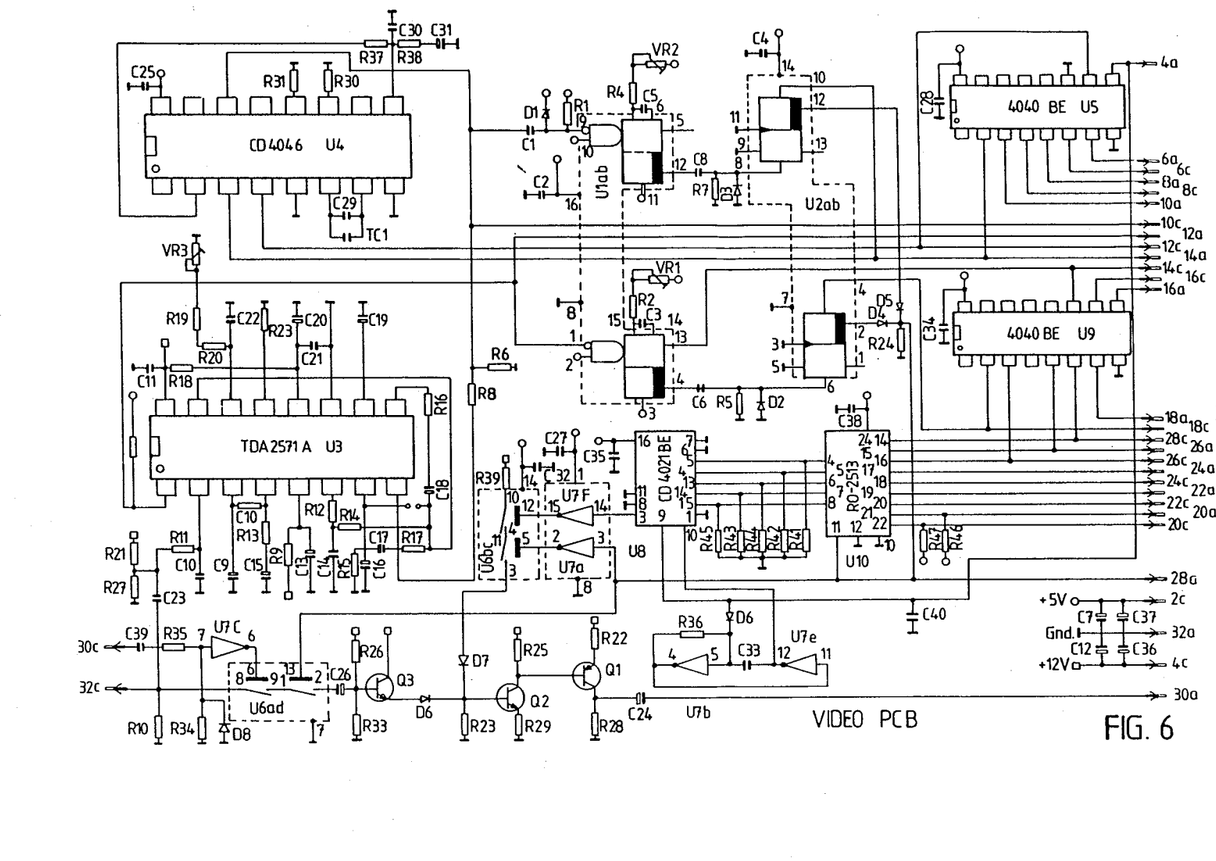
FIG. 6 is a detailed circuit diagram of a video circuit board.
Figure 7:
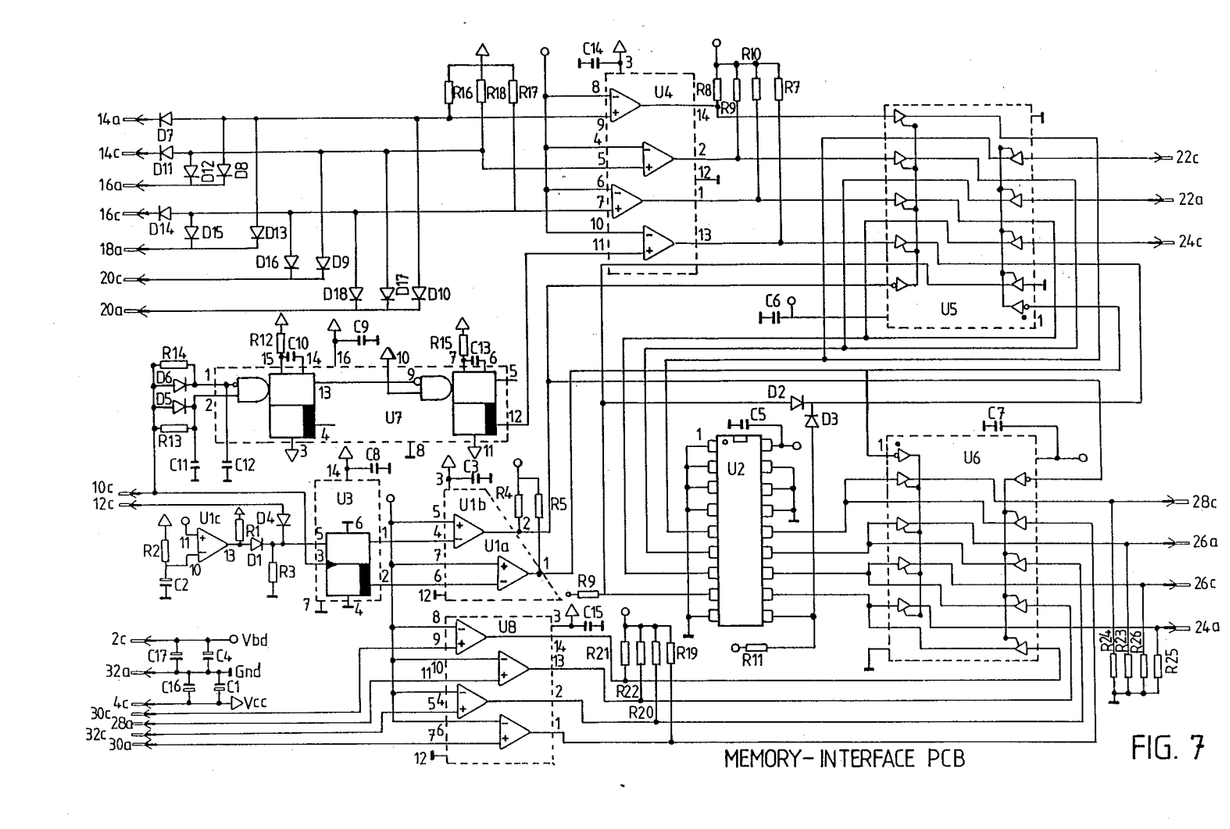
FIG. 7 is a detailed circuit diagram of a memory interface circuit board.

FIG. 3 provides a wiring diagram and pin layout for the circuits shown in FIGS. 5, 6 and 7 as well as pin connections for camera 21, printer signal and other output/input signals. FIG. 5 is identified as the COUNTER PCB in FIG. 3 whilst FIGS. 6 and 7 are identified as VIDEO PCB and MEMORY-INTERFACE PCB respectively. The video sockets are identified as VIDEO IN/OUT at pins 32c and 30a of the VIDEO PCB pin layout. Regulated power, both 12V and 5V is provided as shown and a battery 33 provides back up power together with POWER board which includes the block 31 of FIG. 2. The diagram shows a solenoid drive providing two outputs called "EXP SOLENOID" for controlling solenoid 22. The diagram shows numerous test sockets (1 to 6), a printer outlet and the exposure release connection.

Figure 4A:
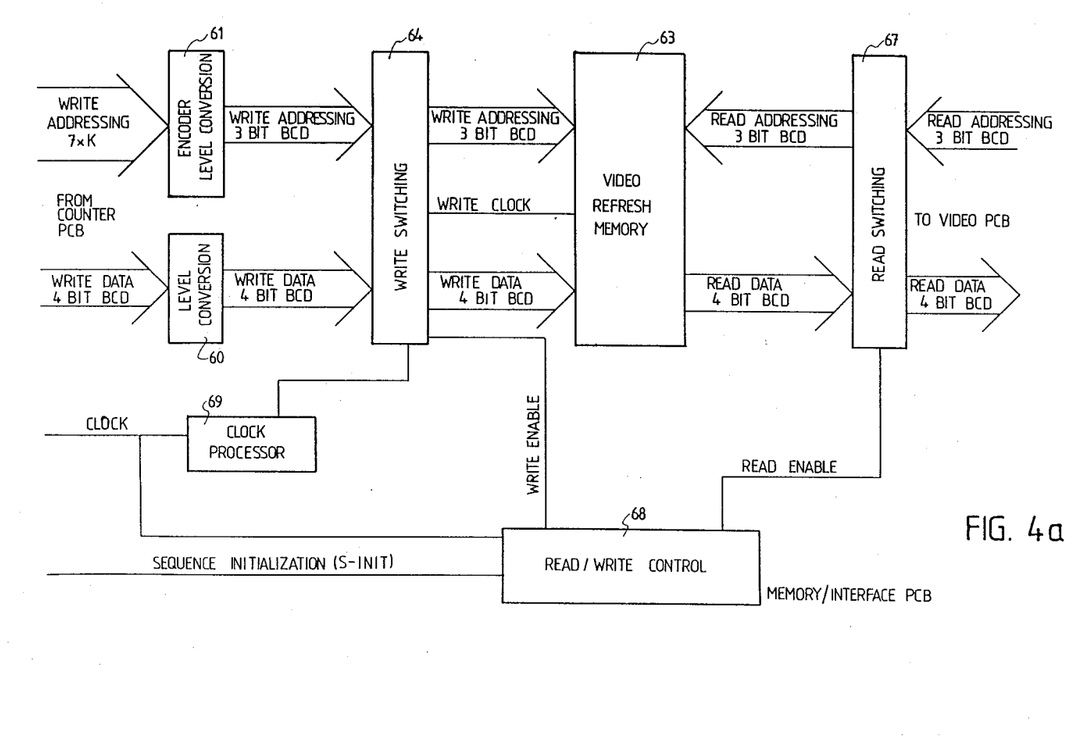
FIG. 4a is a detailed block diagram of a circuit which forms part of the system of the invention.
Figure 4B:
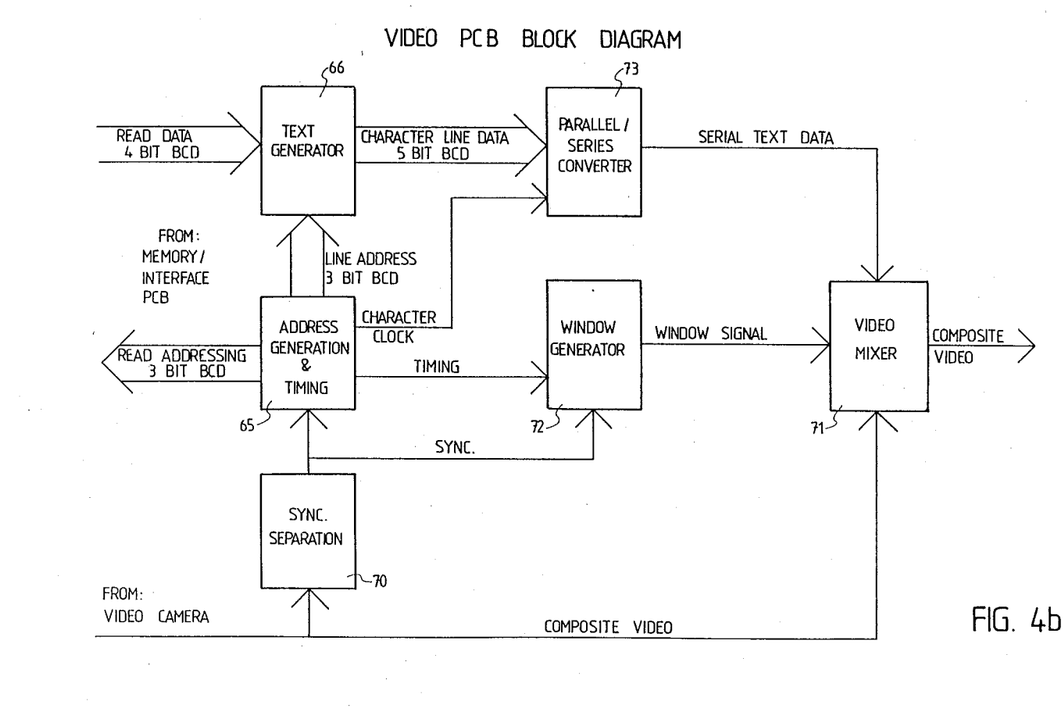
FIG. 4b is a detailed block diagram of another circuit which forms part of the system of the invention.

FIGS. 4a and 4b should be considered in conjunction. The signals for write data obtained from counter pins 14c, 16c, 18c and 20c are made available to level converter block 60 whilst the signals from pins 24a, 26c, 28c, 28a, 30c, 30a are made available to encoder/level converter block 61. Level conversion is required because the logic circuitry of the counter PCB (FIG. 5) and the memory/interface PCB (FIG. 4a) employs logic gates operating off different rail voltages. Block 61 provides a 3 BIT BCD write address for video refresh memory 63. Both the write address and write data are provided via write switching block 64. The diagram of FIG. 4a derives a 3 BIT BCD read address from address generation and timing block 65 of FIG. 4b and 4 BIT BCD read data from text generator 66. A read switching network 67 is interposed between memory 63 and blocks 66, 65.

A sequence initialization or exposure release signal is made available to a read/write control 68 which ensures proper operation of blocks 64, 67. Block 68 provides either a write or read enable signal for controlling blocks 64, 67 respectively to enable information to be written on the memory 63 or read therefrom. A clock input is supplied to clock processor 69 which provides clocking signals for block 64 and memory 63.

In FIG. 4b the video signal from the camera 20 is supplied both the sync separator block 70 and to video mixer 71. The sync pulses derived from block 70 are used in address generation and timing block 65 as well as in window generator 72. Generator 72 provides a window for the composite video signal appearing at mixer 71 so that the code (which corresponds to the displayed by displays 40, 50) is present in the window and is not obscured by other video information.

The text generated by block 66 in response to the 4 BIT BCD data from memory 63 and the line address 3 BIT BCD code from block 65 is converted by parallel/serial converter 73 into serial text information or data and is cyclically clocked to the mixer 71. Converter 73 is controlled by a character clock signal obtained from block 65. The composite video signal at mixer 71 includes video information representative of a still image corresponding to a latent image in camera 21, and a window having a seven digit code, the first two MSB's being representative of a particular unit or photographer and the remaining 5 digits being representative of a frame number. The camera has a latent image correspondingly coded.

FIG. 7 is a detailed circuit diagram of a memory interface circuit shown in block form in FIG. 4a.

Pins 14a, 14c, 16a, 16c, 18a, 20c and 20a provide the seven bit write address from the drives Q5 to Q11 of FIG. 5 available at pins 30a, 30c, 28a, 28c, 26a, 26c and 24a respectively. This address is encoded to a 3 BIT CODE by diodes D7 to D18 and applied to level shifter U4. Resistors R16 to R17 are pull-up resistors. Level conversion of the seven cathode driver signals and encoding into a 3 BIT BCD address code and this information is applied to the memory U2 during the write cycle. The outputs from level shifter U4 are supplied to the write switching network at the left hand of network U5. The right hand side of U5 provides a read switching network.

After an exposure is made in camera 21 the counter indexes the exposure count and sends a signal to the memory. This signal is synchronized with the seven segment display clock to write the updated counter data to the video refresh memory U2. During the write cycle the video address and date lines (see FIG. 6) to the memory are restored. During the write cycle, memory address locations are not addressed sequentially on each positive half cycle of the clock signal. Numerals 6 and 7 are addressed on alternate negative half cycles. A typical addressing sequence would be 1, 6, 2, 7, 3, 6, 4, 7, 5, 6, 1 etc. The write period must exceed one full seven segment display scan cycle. The start and finish time of the write pulse must be synchronized with the scan clock. The write cycle uses memory addresses 1 to 7. The read cycle scans addresses 0 to 7.

The clock input is made available at pin 10c and is supplied to the clock processor U7 as well as to the READ/WRITE control U3. Control U3 provides its outputs to level shifter U1b and U1a which alternatively provide read/write control signals. Coupled to control U3 is a switch on delay network U1c which ensures spurious signals at switch on have no effect on the operation of U3. Components R2/C2 provide a time delay at switch on.

Power supplied at pin 4c is filtered by capacitors C1, C4, C16 and C17.

Pins 30c, 28a, 32a and 30a obtain write data from pins 20c, 18c, 16c and 14c of the counter in FIG. 5. This 4 BIT DATA is supplied to level shifter U8 which in turn provides write data to write switching network U6 at the right hand side thereof. The left hand side of U6 provides read data and is couple to memory U2.

Resistors R7 to R10 are pull up resistors as are R19 to R22 whilst resistors R23 to R26 are pull down resistors.

The address signals available at pins 24c, 22a and 22c are supplied to pins 6a, 6c and 8a of circuit 6 (i.e. to the address generator on the video board) whilst the address signals at pins 28a, 26a, 26c and 24a are supplied to pins 22c, 22a, 24c and 24a of circuit 6 (i.e. to the text generator).

With reference to FIG. 6 the video signal is supplied to pin 33c and controlled switched U6ad. Switches U6ad function as a mixer. Pin 30c is not used and inverter U7c ensures that switch U6a is closed. The window signal derived from window generator U1ab and U2ab is supplied both to modulator U7a and to U6d of the mixer.

The video signal is supplied to sync separator U3 which provides vertical sync pulses to U1a and horizontal sync pulses to U1b. The horizontal pulses are also supplied to phase locked loop (PLL) U4 which is part of the address generator and timing circuit. The remainder of this circuit comprises address generators U5 and U9. PPL U4 provides timing signals for address generators U5 and U9.

A character clocking signal from the address generation and timing circuit is generated as a multiple of the horizontal sync pulse. This pulse is multiplied with the use of the PLL. A divider network provides the various synchronized clock signals. Framing signals are further synchronized with the vertical sync pulses.

The window generator consists of circuits U1ab and U2ab. Circuit U1b is a delay circuit for controlling the horizontal position of the window. Resistor VR2 provides this control. Circuit U1a is also a delay circuit and controls the vertical position of the window. The resistor VR1 is adjusted for this purpose. Both U2a and U2b are flip flops and have their set inputs determined by the respective one of either U1a and U1b and have their reset inputs determined by U5 and U9 respectively. The window information signal is provided to the junction between diodes D4 and D5 and made available to pin 11 of the text generator U10.

Generator U10 is responsive to the signal from the window generator and the 4 BIT code from pins 22c, 22a, 24c and 24a (coupled to pins 28c, 26a, 26c and 24a) from FIG. 7 to provide text information to be displayed in the window. This information is converted into serial information by parallel/serial converter U8 and is clocked to the mixer U6ad. The output of converter U8 is supplied to U7f which controls whether the window is black or white. When U6c is closed it is possible to provide a white text in the window independance of course on switch U6b which is controlled by the window generator. When both switched U6bc are closed resistor 39 couples a window text information to Q3 which is part of a video amplifier circuit. Switch U6d is open and video information is not supplied to the Q3 from pin 32c. In this way the unique code (the same as that of displays 40 and 50 of FIG. 2) may be caused to appear in the window without interference from video information. Transistors Q2, Q1 complete the video amplifier and video output plus the code in the window is available at pin 30a from which it may be supplied to the printer.

Circuit U7e is an oscillator for controlling the converter U8.

Figure 8:
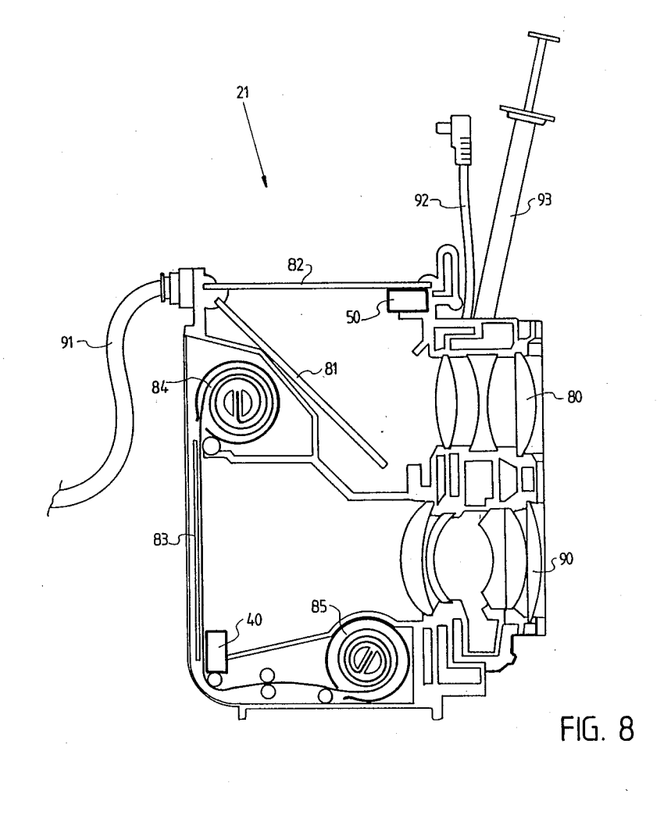
FIG. 8 is a cross sectional view of a typical first camera.

FIG. 8 shows a cross-sectional view of typical camera 21. This camera is a twin lens reflex camera having a first lens system 80 which provides an image of an object which is reflected by mirror 81 onto a glass screen 82 where it is visible to a viewer. The display 50 is within the camera and is visible to the viewer who may see the code representative of the unit or photographer number and the frame number. Film 83 is within the camera and extends between rolls 84, 85. Adjacent the film 83 display 40 is positioned. This display is periodically strobed to impress the unique code into the film. A further lens system 90 projects the image of an object onto the film 83. The camera has a shutter which has been omitted for the sake of clarity. Cable 91 conveys signals to both displays. A flash sync cable 92 projects from the camera and the shutter release 93 is illustrated.

What is claimed is:

1. A system including a first camera for producing latent images of an object on film which may subsequently be processed; a second camera integral with or adjacent the first camera adapted to produce images substantially corresponding to the latent images of the first camera whereby respective images of the second camera correspond to respective latent images of the first camera; coding means including at least one light emitting display associated with the first camera for uniquely coding each said latent image, said coding means correspondingly coding the images produced by the second camera, said coding means further including a counter for providing in response to a release signal a code indicative of the number of latent images produced, an identification code matrix for producing a user code indicative of a particular user, a mixer for combining the latent image code and the user code, and drivers for driving said light emitting display; and, image display means for displaying or providing viewable images of the images produced by the second camera.

2. The system of claim 1, wherein said first camera is a still camera and said second camera is a video camera.

3. The system of claim 2, wherein said image display means comprises a thermal printer.

4. The system of claim 3, wherein said one light emitting display is mounted within said first camera adjacent film therein and is strobed or switched to impress a unique code on each said latent image.

5. The system of claim 4, wherein said coding means includes two light emitting displays, and wherein one of said displays is arranged to be visible to the user and is lit when the system is in use, such that the codes displayed by the two displays correspond.

6. The system of claim 1, including an oscillator for providing timing pulses for said counter.

7. The system of claim 1, including an exposure timer for timing a strobe period for said one light emitting display.

8. The system of claim 5, wherein said light emitting displays comprise seven segment diode displays having seven digits, some of said digits being for the display of the user code and some for the display of the latent image code.

9. The system of claim 3, including a memory for storing said latent image code and said user code, read and write switching networks for reading and writing from the memory, a read-write control circuit for controlling the switching networks, said read switching network receiving read addressing data and providing read data.

10. The system of claim 9, including a video text generator for receiving read data from the read switching network and for providing character line data, and an address generation and timing circuit for providing line address data to the text generator and read address data to the read switching network.

11. The system of claim 10, including a sync pulse separator for separating vertical and horizontal sync pulses from a video signal derived from the video camera.

12. The system of claim 11, including a window generator providing a window signal for blanking video information from a portion of the video signal.

13. The system of claim 12, wherein said address generator and timing circuit and said window generator are controlled by the vertical and horizontal sync pulses separated from the video signal and said system further includes a mixer for combining said window signal with said video signal and said character data to produce a composite video signal plus a window within which are characters representative of the unique code.

14. The system of claim 13, wherein said composite video signal is supplied to the thermal printer.

15. The system of claim 13, wherein said composite video signal is stored in a storage means from which it may subsequently be retrieved for viewing or reproduction.

16. The system of claim 13, including a serial to parallel converter receiving the character line data and converting it to serial data for supply to the mixer.

17. The system of claim 10, wherein a memory refresh signal is obtained from an input to the counter and is supplied to the memory to commence a write cycle.

18. The system of claim 13, wherein said first camera has a shutter release driven be a solenoid, said solenoid derives a delayed control signal from the release signal for triggering the solenoid a predetermined period after the production of the composite video signal.

* * * * *